United States Patent [19]

Kurrle et al.

[11] Patent Number: 4,602,514

[45] Date of Patent: Jul. 29, 1986

[54] DEVICE FOR MEASURING THE VOLUME FLOW OF A GAS IN A DUCT

[75] Inventors: Hermann Kurrle; Wolfgang Ruf; Adelbert Zeller, all of Kolbingen, Fed. Rep. of Germany

[73] Assignee: Ferdinand Schad KG, Kolbingen, Fed. Rep. of Germany

[21] Appl. No.: 659,671

[22] Filed: Oct. 11, 1984

[30] Foreign Application Priority Data

Oct. 11, 1983 [DE] Fed. Rep. of Germany ....... 3336911

[51] Int. Cl.$^4$ ............................................. G01F 1/46
[52] U.S. Cl. ................................ 73/861.66; 73/202
[58] Field of Search ............ 73/198, 202, 861.61, 73/861.65, 861.66

[56] References Cited

U.S. PATENT DOCUMENTS

| | | | |
|---|---|---|---|
| 3,398,765 | 8/1968 | Oshima et al. ................... | 73/861.61 |
| 3,559,482 | 2/1971 | Baker et al. ...................... | 73/202 |
| 3,581,565 | 6/1971 | Dieterich .......................... | 73/861.66 |
| 3,803,291 | 4/1974 | Dieterich .......................... | 73/861.66 |
| 4,036,054 | 7/1977 | Goulet .............................. | 73/861.66 |
| 4,372,171 | 2/1983 | Brandt, Jr. ........................ | 73/861.61 |
| 4,444,060 | 4/1984 | Yamamoto ....................... | 73/861.66 |
| 4,453,419 | 6/1984 | Engelke ............................ | 73/861.66 |
| 4,476,729 | 10/1984 | Stables et al. ..................... | 73/861.61 |

Primary Examiner—Herbert Goldstein
Attorney, Agent, or Firm—Antonelli, Terry & Wands

[57] ABSTRACT

A device for measuring the volume flow of a gas in a duct for making it possible to effect adjustment or balancing at the manufacturer's location and then being installable in a duct at any desired location without leading to varied measurements by providing a plurality of evenly distributed polygonal collecting pipes with unilaterally arranged flow entrance ports connected with a compact unit. A flow baffle is arranged at the entrance point of the collecting pipes, and a nozzle is arranged downstream of the flow rectifier. The measuring probe is located downstream of the nozzle in the measuring unit.

14 Claims, 6 Drawing Figures

DEVICE FOR MEASURING THE VOLUME FLOW OF A GAS IN A DUCT

The invention relates to a device for measuring the volume flow of a gas in a duct, with a measuring probe.

In the air conditioning technology, volume flow regulators have been used for a long time for the purpose of maintaining the volume flow in the duct constant, independently of a fluctuating duct pressure. In this connection, with a so-called variable volume flow system, the volume flow can be varied in correspondence with the occurring loads by way of an electric or pneumatic servomotor, to thereby keep the volume flow in the duct constant independently of the duct pressure. One disadvantage in these volume flow regulators is that a minimum differential pressure of more than 150 Pa is required to effect stable control. Another disadvantage resides in the high mechanical sensitivity of such a volume flow regulator: The bearings for the spring and the flap must be adapted very carefully to each other. The flap bearings can be contaminated during operation so that an accurate control of the flaps is no longer possible. A further drawback results from the fact that dust accumulation is unavoidable and thus a preset torque will be subject to changes during operation, leading to faulty control. In order to overcome these disadvantages, an electric or pneumatic measuring probe is now being proposed, measuring the flow velocity and regulating the volume flow by way of a servomotor and a flap. The flap in this arrangement requires no special designs. It is possible to utilize well-tried, commercially available flaps. The conventional pneumatic or electric measuring probes are likewise available in a rugged and reliable construction. In the electric probes, regulation takes place electronically so that the regulation per se attains accurate values. One disadvantage of these conventional probes serving as the measuring instrument resides in that they indicate, with the volume flow per se being the same, a great variety of different measuring results, depending on whether they are arranged in a duct after a relatively long, straight route, or behind an elbow. Thus, the location in the duct where they are located plays a part in whether the measured velocity indeed corresponds to the required volume flow. Although efforts have been made to provide long balancing paths upstream of the measuring devices, such paths generally can nowise be realized under practical conditions so that the measuring device must be located, depending on the installation conditions, either downstream of a relatively straight balancing path or directly downstream of an elbow. The deviating measuring indications of the measuring probes, which latter are rather accurate per se, are due to the fact that, for example downstream of an elbow, the actual linear flow is superimposed by a swirling flow. The aforementioned circumstances have the result that a presetting or balancing of the measuring devices at the manufacturing plant is impossible. Rather, an attempt is made to effect adjustment or balancing individually at the site after installation of the probe, by trying to determine which measuring point represents a specific volume flow, or alternatively by balancing a potentiometer associated with the measuring device, with a given volume flow, in such a way that the volume flow, which must be known, is reproduced by the measurement indication. These individual adjustments are expensive from the viewpoints of time and personnel, apart from the fact that they are frequently executed only imperfectly inasmuch as neither the necessary testing instruments nor adequately qualified personnel is available at the installation site. This leads to the result that often an inaccurate volume control is performed in spite of measuring probes that are accurate per se.

Therefore, the invention is based on the object of providing a device of the above-discussed type making it possible to effect adjustment or balancing at the manufacturer's and then being installable in a duct at any desired location without leading to variegated measuring results.

According to the invention, the above-mentioned object is attained by a device of the type described above which is characterized in that a plurality of essentially evenly distributed collecting pipes with unilaterally arranged flow entrance ports is connected with a compact measuring unit; that the measuring unit comprises a tubular housing; that a flow rectifier is arranged at the entrance point of the collecting pipes; that a nozzle is arranged downstream of the flow rectifier; and that the measuring probe is located downstream of the nozzle in the measuring unit. The measuring device of this invention achieves a measuring accuracy being on the order of about 2%, independently of the site of installation downstream of an elbow or a straight balancing route; such deviation is definitely negligible since it lies within the tolerance range of the entire volume flow control system. The high measuring accuracy, independent of the location of installation, achieved by the device of this invention is, in particular, likewise independent of the diameter of the ducts wherein the measuring device is inserted. It is thus readily possible to effect presetting at the manufacturing plant without having to know the individual installation situation. Accordingly, presetting can be performed in an assembly line operation; an individual adjustment is eliminated. With an adjustment at the manufacturer's, the necessary prerequisites from a technical and personnel viewpoint are likewise provided so that adjustment can be accomplished with maximum precision. The measuring device of this invention can then be built in at the installation site without any problems whatever and without having to consider special conditions, just as circumstances require at the installation site, i.e. downstream of a straight balancing path, or directly behind an elbow, without evoking any sizable effects on measuring accuracy of the measuring device of this invention and on the control properties of a control unit connected therewith in a volume flow regulating system. The measuring probe arranged in the measuring device of this invention will always be exposed to air low in turbulence and free of swirls, on account of the structure according to this invention. The high measuring accuracy attained by the measuring device of this invention is not impaired in any way, either, by backwash of the gas flow occurring downstream of elbows, as it is usually found at that location.

In order to further improve the measuring result, a preferred embodiment provides that the collecting pipes are fashioned as polygonal pipes, especially square pipes. It is thereby made possible to arrange the flow entrance ports over their entire area exactly perpendicularly to the gas flow so that obliquely oncoming flow with ensuing falsification does not occur. The device of this invention should exhibit at least two collecting pipes, but, depending on the size of the duct, six to eight or more arms can be suitable and can be realized without any problems in the device of this invention. However, in a preferred arrangement, the device exhibits four collecting pipes, which is adequate for a wide range of different duct diameters so that this can be considered an optimum norm. Also, while it is advantageous in most cases to arrange the measuring unit in the center of the collecting pipes and cover same by a cap on the front side facing away from the probe, it is possible, depending on the configuration of the ducts in which the device is to be installed and on the local conditions, to make the further provision that the measuring probe is located, by way of connecting conduits, laterally of the collecting pipe arrangement. In this case, the device advantageously comprises a ring conduit connecting the collecting pipes.

Additional advantages and features of the invention can be seen from the claims and from the description below wherein embodiments of the device of this invention will be explained in greater detail.

In the drawings:

FIG. 1b is a section through a collecting pipe of the device along line 1b—1b of FIG. 1a;

FIG. 4a is a measuring diagram with measurements of the duct velocity with and without the device of this invention, over the control range, while

Figure 1A:
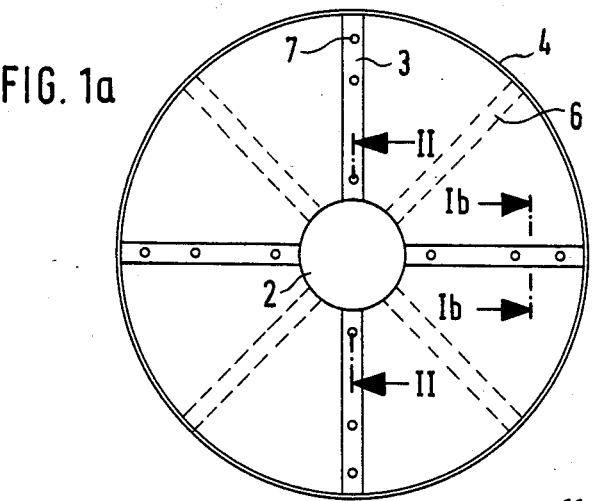
FIG. 1a shows a top view of one embodiment of the invention, inserted in a circular duct.
Figure 1B:
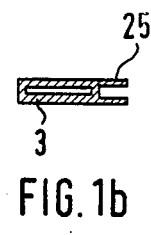

The device of this invention for measuring the volume flow of a gas in a duct comprises, in the embodiment shown in FIG. 1, a central measuring unit 2 from which extend, first of all, four collecting pipes 3 in a stellate pattern toward the outside up to the inner wall of the gas-conducting duct 4, the measuring device being arranged in this duct. Besides the four collecting pipes 3, further collecting pipes 6 can also be provided, as shown in dashed lines, so that, in total, eight collecting pipes can be present. The number of collecting pipes 3, 6 depends, in essence, on the diameter of the gas-conducting duct. The illustration of FIG. 1a is seen in the oncoming flow direction of the gas. In this direction, the collecting pipes 3 exhibit flow entrance ports 7 arranged radially in a logarithmic pattern. The collecting pipes 3 are fashioned as square pipes, as can be derived from FIG. 1b, the ratio of the height perpendicularly to the flow direction to the width of the pipes in the flow direction being on the order of about 1:10.

Figure 2:
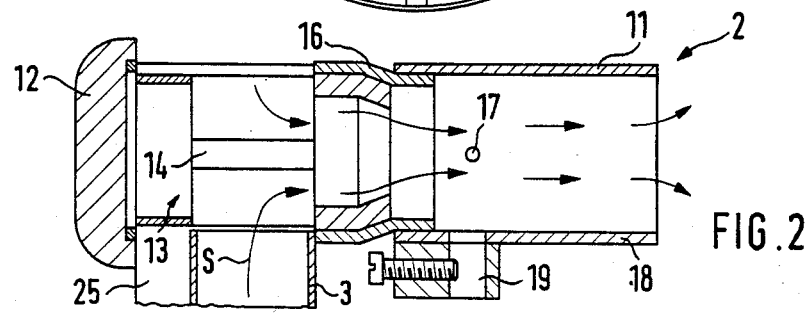
FIG. 2 is a section through the central portion of the embodiment shown in FIG. 1a along line II—II.

The collecting pipes 3, as can be seen especially from the sectional view of FIG. 1b and from FIG. 2, exhibit fin-shaped extensions running in parallel to the main flow direction within the pipe, these extensions being oriented in opposition in the flow. These extensions 25 in front of the collecting pipes 3 proper serve for preventing falsification of the measuring results that may occur when the air flow is superimposed by a swirling flow, particularly when the flow enters an elbow; if these fins or extensions 25 were not present, the measuring arm would be exposed to oblique flow. Thus, the fins or extensions 25 serve for avoiding a rotational movement and oblique oncoming flow in front of the measuring arms or collecting pipes 3.

The central measuring unit of the device of this invention is illustrated in greater detail in FIG. 2 in a sectional view along line A—A as indicated in FIG. 1. The measuring unit 2 is fashioned as a tubular housing 11, the axis of which extends in the flow direction of the gas flowing in the duct 4 and thus perpendicularly to the collecting pipes 3. On the oncoming flow side, the measuring unit 2 is sealed, for example by a cap 12. Directly behind the cap 12, the collecting pipes 3 terminate radially into the measuring unit 2. A flow rectifier 14 in the form of baffles is arranged in the center of this terminating zone 13. The flow rectifier 14 deflects the gases, fed radially by the collecting pipes 3 to the axis of the duct 4 and the measuring unit 2, in the axial direction. A nozzle 16 is provided downstream of the flow rectifier 14, this nozzle constricting the flow path of the gas proportion supplied by way of the collecting pipes 3. Directly downstream of the nozzle 16, a measuring probe 17 is arranged which is illustrated merely schematically as a measuring point.

The gas flow S is illustrated by arrows. The gas exits from the measuring unit 2 at the end of a pipe 18 extended past the measuring probe 17. The measuring probe 17 can be introduced into the housing 2 through a lateral opening 19, for example, and can be clamped in place in this lateral opening 19.

By means of the measuring device of this invention, the gaseous stream is, so to speak, withdrawn in samples and collected over the entire cross section of duct 4, made uniform in an optimum fashion, and thereafter measured with the measuring probe 17. Accordingly, the latter measures an average value of the velocity and thus also of the volume flow rate of the entire duct 4. The calibration or presetting of the measuring device is effected at the manufacturing plant.

Figure 3:
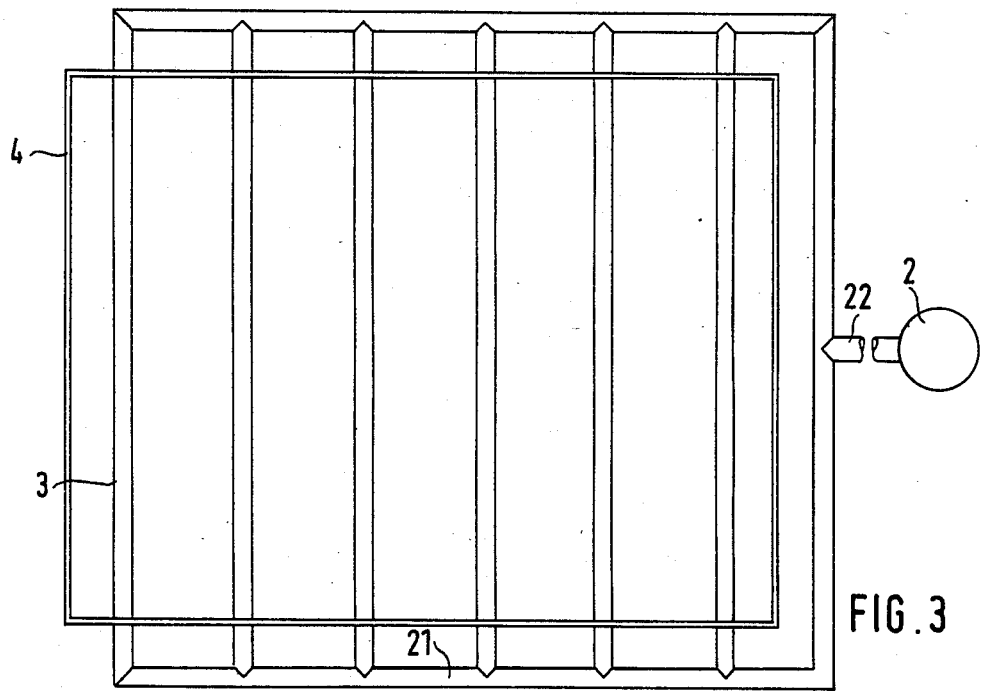
FIG. 3 shows another embodiment of the device of this invention.

The embodiment of FIG. 1a can also be provided in a duct having a rectangular cross section. Furthermore, FIG. 3 shows another embodiment wherein the device of this invention is illustrated in connection with a duct having a rectangular cross section; however, this duct could also have a circular cross section. The collecting pipes 3 are arranged in a grid- or net-like pattern in the embodiment of FIG. 3, each pipe 3 extending over the entire height of the duct and exiting therefrom at the top side and bottom side. Several collecting pipes 3 are provided over the width of the duct; although, in the illustrated embodiment, these pipes have the same mutual spacing, such spacing can also be in any other predetermined pattern, for example in a logarithmic mode. As contrasted to the embodiment of FIG. 1, the measuring unit 2, in the arrangement of FIG. 3, is not located in the center of the duct. Rather, the individual collecting pipes 3 are in communication with one another through a manifold 21 leading, via a connecting pipe 22, to the measuring unit 2 located outside of duct 4. The interior of the measuring unit 2 likewise corresponds to FIG. 2. The measuring unit 2 could be arranged outside of the duct 4 even in case of a stellate arrangement of the collecting pipes 3 as seen in FIG. 1a.

Figure 4A:
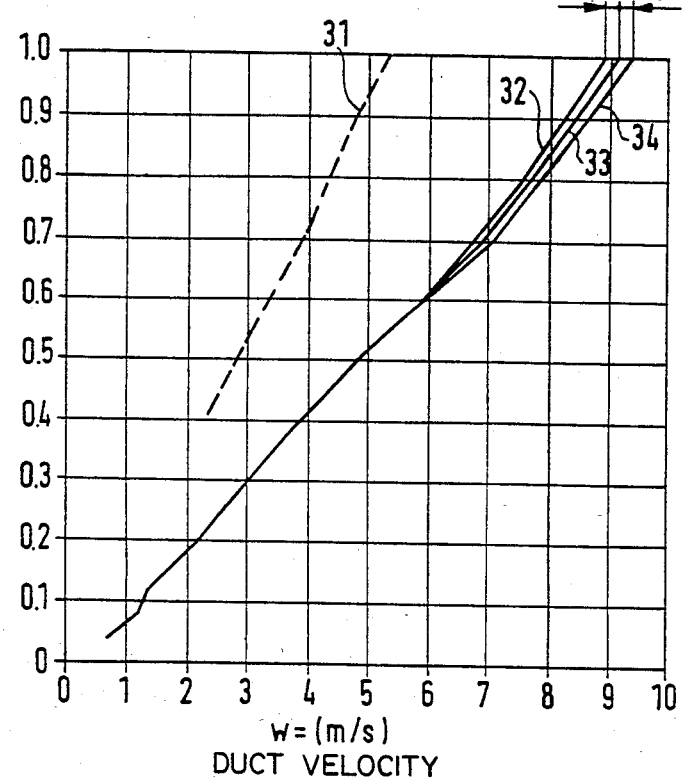
Figure 4B:
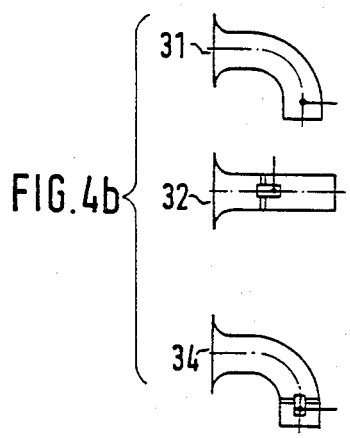
FIG. 4b shows respectively the arrangement of the measuring devices in the flow duct.

Measurements were conducted with the measuring device according to this invention—as compared with the conventional prior-art procedure—as illustrated in the diagram of FIG. 4a; in relative values, the abscissa indicates the duct velocity and the ordinate indicates the regulating zone as the associated range wherein the corresponding change in volume flow is to take place. Thus, the value plotted on the ordinate is a relative measure for the energy employed, in this case voltage, for producing the respective duct velocity in the experimental arrangement. Curve 32 shows the location of a measuring device according to the invention in a linear duct, i.e. with a linear oncoming flow (also FIG. 4b), whereas curve 34 represents the flow to which a measuring device of this invention is exposed by way of an elbow. Curve 33 is the value averaged from 32 and 34, according to which the calibration or the manufacturer's presetting can be effected. The two extreme flow conditions, linear oncoming flow, on the one hand, and flow proceeding via a 90° elbow, on the other hand, then cause merely a maximum deviation of 2.2% from the presetting at the manufacturing plant.

In contrast thereto, the curve 31 shows the flow to which a measuring probe is exposed in the conventional way without the measuring device of this invention, by way of an elbow, where a conventional measurement of a linear flow would result in a value approximately within the zone of curves 32–34. The deviation of curve 31 from the other curves clearly demonstrates that here, when a preliminary adjustment to an average value is made, deviations which are too large must be tolerated and/or a presetting at the manufacturing plant is impossible; rather, adjustment must be effected respectively only after the installation in dependence on the conditions prevailing at the installation site.

The features of the invention disclosed in the above description, in the drawings, as well as in the claims can be of importance individually as well as in suitable combinations for realizing the invention in its various embodiments.

What is claimed is:

1. Device for measuring with a probe the volume flow of a gas in a duct, comprising a measuring means having a plurality of collecting pipe distributed substantially evenly over the duct passage and extending perpendicular to the axis of the duct passage, the collecting pipes having flow entrance ports oriented in opposition to the gas flow; a tubular housing having a measuring chamber in which the collecting pipes terminate and in which a measuring probe is arranged for measuring the gas flow; and fins provided on the collecting pipes at each side of the flow entrance ports and extending in opposition to the gas flow to define an entrance orifice.

2. Device according to claim 1, wherein the collecting pipes are polygonal in shape.

3. Device according to claim 2, wherein the collecting pipes are square pipes.

4. Device according to claim 1, wherein the ratio of the height of the collecting pipes perpendicular to the flow direction of the gas to the width of the collecting pipes extending in parallel to the gas flow is smaller than 1:4.

5. Device according to claim 1, wherein the collecting pipes are arranged in a stellate pattern.

6. Device according to claim 1, wherein the collecting pipes are arranged in a grid-like pattern.

7. Device according to claim 1, wherein the measuring chamber is located in the center of the collecting pipes and is covered by a cap on the front side facing away from the probe.

8. Device according to claim 1, wherein the measuring chamber is located via connecting conduits laterally of the collecting pipes.

9. Device according to claim 8, wherein the connecting conduits form a ring conduit.

10. Device according to claim 1, wherein four collecting pipes are provided.

11. Device according to claim 1, wherein the flow entrance ports are distributed in a logarithmic pattern from the outer end of the collecting pipes toward the interior.

12. Device according to claim 1, wherein baffles are provided in the measuring chamber to deflect the gaseous flow conducted by the collecting pipes to the measuring chamber.

13. Device according to claim 1, wherein the fins are oriented in parallel to the primary gas flow.

14. Device according to claim 1, wherein four collecting pipes are provided to form a stellate arrangement.

* * * * *